United States Patent
Fixemer et al.

[11] Patent Number: 6,102,448
[45] Date of Patent: Aug. 15, 2000

[54] ARRANGEMENT FOR CONNECTING TWO TUBULAR ELEMENTS

[75] Inventors: Andreas Fixemer, Baden-Baden; Carsten Mücke, Bühl, both of Germany

[73] Assignee: Aeroquip-Vickers International GmbH, Baden-Baden, Germany

[21] Appl. No.: 09/022,200

[22] Filed: Feb. 11, 1998

[30] Foreign Application Priority Data

Feb. 12, 1997 [DE] Germany ............... 197 05 222

[51] Int. Cl.[7] ........................................... F16L 25/00
[52] U.S. Cl. ..................... 285/330; 285/921; 277/626
[58] Field of Search .................................. 285/921, 330, 285/419, 373, 910, 918; 277/626

[56] References Cited

U.S. PATENT DOCUMENTS

| | | | |
|---|---|---|---|
| 3,248,133 | 4/1966 | Michnoff | 285/921 X |
| 3,494,414 | 2/1970 | Warner | 277/626 X |
| 5,219,188 | 6/1993 | Abe et al. | 285/921 X |

FOREIGN PATENT DOCUMENTS

| | | |
|---|---|---|
| 298427 | 5/1972 | Austria . |
| 0038421 | 10/1981 | European Pat. Off. . |
| 1104273 | 4/1961 | Germany . |
| 6750288 | 8/1968 | Germany . |
| 2146292 | 3/1973 | Germany . |
| 9417059 | 2/1995 | Germany . |
| 405839 | 7/1966 | Switzerland . |
| 9302313 | 2/1993 | WIPO . |

*Primary Examiner*—Terry Lee Melius
*Assistant Examiner*—James M Hewitt
*Attorney, Agent, or Firm*—Ostrolenk, Faber, Gerb & Soffen, LLP

[57] ABSTRACT

An arrangement for connecting two pipe ends comprising a respective closure part around each of the pipe ends. The closure parts are connected together in a bayonet-type connection. One closure part includes an annular surface with a first part parallel to a sealing device placed between the pipe ends and with a second part inclined with respect to the sealing device. The latter part draws the closure parts and the pipe ends together as the closure parts are rotated relatively toward each other and as the one closure part is guided along the inclined portion of the annular surface. A respective sealing surface is provided on each of the pipe end parts. The sealing surfaces are brought axially toward each other by movement together of the closure parts. A sealing device is clamped between the sealing surfaces on the pipe ends, when they are brought together by rotating the closure parts, for providing a pressure-tight closure of the pipes at the sealing surfaces, in that rotation of the closure parts to the locked position draws the sealing surfaces against the sealing device, while rotation of the closure to the unlocked position before the closure parts are separated moves the sealing surfaces off sealing against the sealing device, whereby the sealing device is clamped only in the axial direction.

19 Claims, 7 Drawing Sheets

ARRANGEMENT FOR CONNECTING TWO TUBULAR ELEMENTS

BACKGROUND OF THE INVENTION

The present invention relates to an arrangement for connecting two tubular elements, in particular the ends of two pipes which are particularly useful in a cooling system, to a bayonet type connection between the pipes and particularly to a sealing device between the pipe ends.

It is known, for example that to produce a coolant circuit, one connects individual pipes to one another at their ends. Bayonet closures designed, for example, as quick fitting pipe unions, may be used. The bayonet closures usually have two associated closure parts which engage in one another. To achieve a locked position, they can be rotated with respect to one another and can be displaced in the axial direction with respect to one another. Use of a sealing device to achieve a seal between the tubular elements to be connected is known. In known bayonet closures, one of the closure parts has a conical run-up surface for the sealing device, which is usually designed as an O-ring, so that the sealing device is clamped radially. Using a conical run-up surface produces very great forces. But it has the disadvantage that it is also necessary to apply very high unlocking forces when unlocking the coupling, particularly after the quickfitting pipe union has been in use for a long time. Moreover, there is an excessive load on the sealing device, which leads to the device becoming worn.

SUMMARY OF THE INVENTION

It is an object of the present invention to provide a pipe coupling arrangement of this type which is of simple design, achieves a highly effective sealing action and can be used without having to apply much force.

According to the invention, this object is achieved by an arrangement for connecting two pipe ends comprising a respective closure part around each of the pipe ends. The closure parts are connected together in a bayonet-type connection. One closure part includes an annular surface with a first part parallel to a sealing device placed between the pipe ends and with a second part inclined with respect to the sealing device. The latter part draws the closure parts and the pipe ends together as the closure parts are rotated relatively toward each other and as the one closure part is guided along the inclined portion of the annular surface. A respective sealing surface is provided on each of the pipe end parts. The sealing surfaces are brought axially toward each other by movement together of the closure parts. A sealing device is clamped between the sealing surfaces on these pipe ends, when they are brought together by rotating the closure parts, for providing a pressure-tight closure of the pipes at the sealing surfaces, in that rotation of the closure parts to the locked position draws the sealing surfaces against the sealing device, while rotation of the closure to the unlocked position before the closure parts are separated moves the sealing surfaces off sealing against the sealing device, whereby the sealing device is clamped only in the axial direction.

Because the sealing device is clamped between two sealing surfaces in order to ensure a pressure-tight closure of the tubular elements when the arrangement is in the locked position, and because the sealing surfaces are moved axially with respect to one another by the bayonet closure being moved into the locked position, and because the sealing surfaces are spaced apart from one another on reaching the locked position in such a manner that the sealing device is clamped only in the axial direction, it is only necessary to apply a relatively small force both to lock and unlock the device while nevertheless achieving a high sealing action. The forces to be applied are preferably so low that the coupling can be locked and unlocked without additional tools, i.e. by using bare hands.

In a preferred refinement, each closure part comprises a plurality of, and preferably two, partial elements. This makes it advantageously possible to retrofit the closure parts on a pipeline which has already been laid. In this case, the partial elements of the closure parts can preferably be latched together, so that they can easily be assembled to form the complete closure parts.

In a further preferred refinement, the first closure part comprises a sleeve, and the second closure part has a plug-in section which can engage in the sleeve. This simply produces a form-fitting and force-fitting connection between the two closure parts.

In a further, particularly preferred refinement, the axial travel of the closure parts for reaching the unlocked position is greater than that axial travel of the sealing surfaces which is necessary to relieve the load on the sealing device. This ensures that there is no danger of detaching the tubular ends during unlocking of the closure parts. The sealing action of the sealing device is advantageously eliminated before the closure parts are completely unlocked. This makes it: possible, for example, for a pressurized medium in the pipeline to escape without danger.

Moreover, a preferred sealing device comprises an annular element, having a profile which is formed such that it can be axially compressed without significant radial stretching. The sealing device can achieve good sealing even with a slight axial loading or compression by the sealing surfaces without the need for an additional radial compression. For this purpose, the sealing device preferably has profile features which can be displaced axially by the sealing surfaces without the profile features moving radially. The forces which have to be overcome by the axial compression of the profile features when moving the closure parts into the locked position can later be utilized to unlock the bayonet closure, so that the forces which have to be applied externally can be relatively low.

Other features and advantages of the present invention will become apparent from the following description of the invention which refers to the accompanying drawings.

DETAILED DESCRIPTION OF EMBODIMENTS OF THE INVENTION

Figure 1:
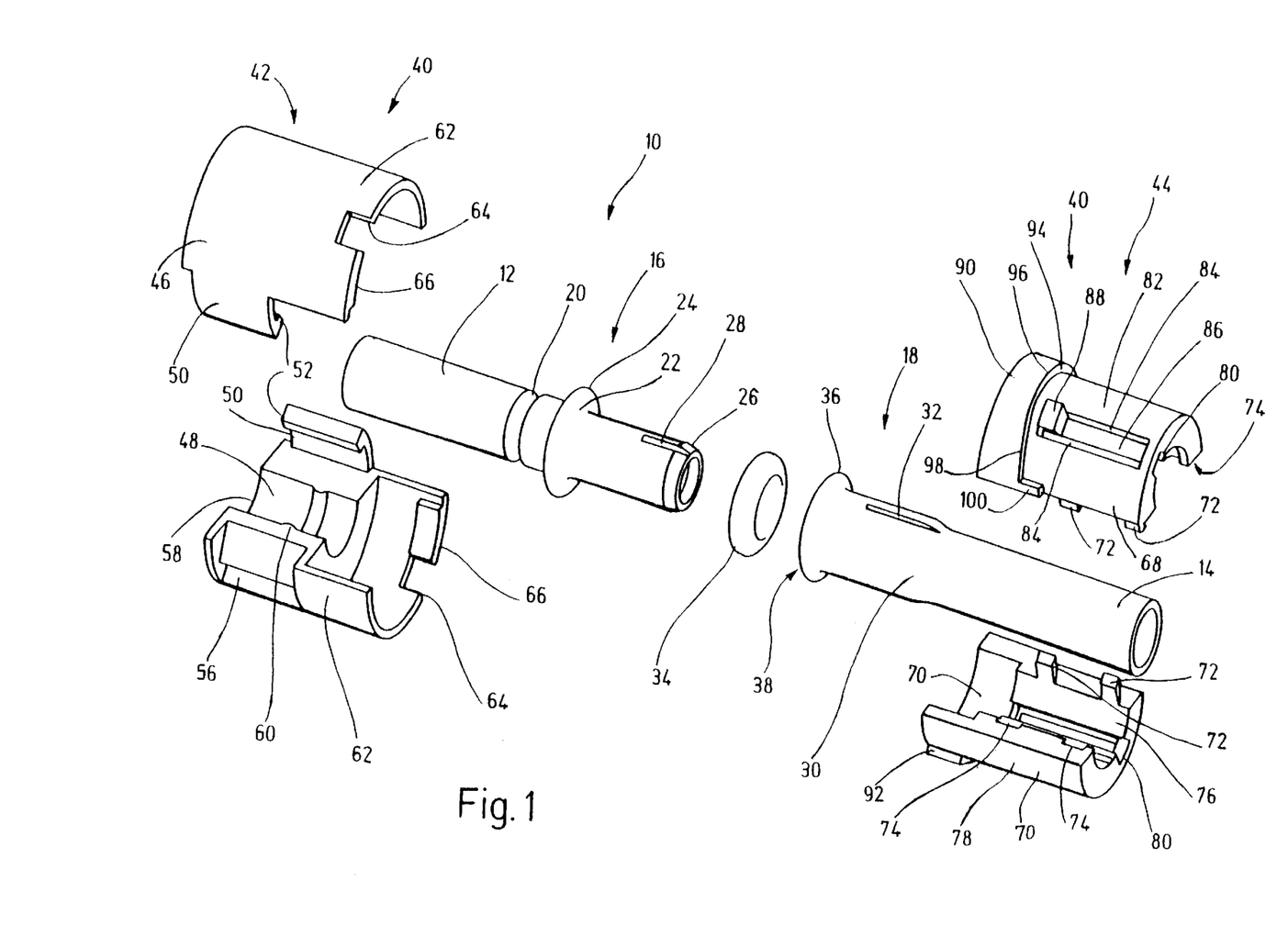
FIG. 1 is an exploded perspective view of the arrangement according to the invention.

FIG. 1 is an exploded view of an arrangement 10 of the invention. The arrangement 10 includes a first pipe 12 and a second pipe 14. Only the joinable end regions 16 and 18 of the pipes 12 and 14 respectively are illustrated.

The pipe end region 16 of the first pipe 12 has an annular or circumferential constriction 20 away from its free end. A first sealing surface 22 is formed by a dish-like flange 24, and is provided at a distance from the constriction 20 and toward the free end. The sealing surface 22 is a radially outwardly projecting annular surface. Furthermore, the end 16 region terminates at its end face in a bevel 26. A catch-like projection 28 extends in the axial direction, protrudes radially outward and extends from the free end side of the pipe 12 toward the flange 24.

The end region 18 of the second pipe 14 has a widened section 30, which is shaped such that an internal diameter of the widened section 30 essentially corresponds to the external diameter of the end region 16 of the first pipe 12. This enables the end 16 of the first pipe 12 to be pushed axially into the widening 30 of the second pipe 14. The widening 30 has an axially running slot 32, which corresponds in position and profile to the projection 28 provided on the end 16 of the pipe 12. The axial extent of the slot 32 is greater than the axial extent of the projection 28, so that when the projection 28 has engaged in the slot 32, the pipes 12 and 14 cannot be rotated with respect to one another but can be displaced axially. In a further embodiment, a slot may be provided instead of the projection 28 and a radially inwardly directed projection may be provided instead of the slot 32, for likewise ensuring that the pipes are secured against rotation while simultaneously being axially displaceable with respect to one another.

The end region 18 of the second pipe 14 has a dish-like or bell-like flange 36 at its end, which forms an annular sealing surface 38. The annular sealing surfaces 22 and 38 lie opposite one another and run parallel to one another.

A sealing device 34 is indicated diagrammatically in FIG. 1. Its precise structure is explained below with reference to FIGS. 10 and 11. The sealing device 34 is essentially annular and has an internal diameter which corresponds approximately to the external diameter of the end region 16 of the pipe 12. As a result, the sealing device 34 can be pushed onto the end region 16 to the sealing surface 22. When the pipe 14 is then attached, the sealing device 34 lies between the annular sealing surfaces 22 and 38 of the pipes 12, 14.

The arrangement 10 furthermore comprises a bayonet closure 40 comprised of two closure parts 42 and 44. The closure part 42 comprises two shell-like part elements 46 and 48, each of approximately semicircular shape. Each part element 46 and 48 has a projection 50, which leads into a radially inwardly directed latching lug 52.

Correspondingly, each part element 46 and 48 has an axially running groove-like depression 56, with dimensions which correspond to the latching lug 52. The multi-part closure part 42 makes it possible to retrofit the closure part on the pipe 12. To do this, the part elements 46 and 48 are guided around the pipe 12 and are then latched together. In the following description, it is assumed that the closure part 42 forms a unit comprised of the part elements 46 and 48.

The closure part 42 has a continuous axial opening 58, with a diameter that corresponds to the external diameter of the pipe 12. This ensures that the closure part 42 is axially movable on the pipe 12. The continuous opening 58 has an annular, radially inwardly directed bead 60, which corresponds in shape to the constriction 20 in the pipe 12. This enables the closure part 42 to be placed and fixed in a defined position with respect to the flange 24 and the sealing surface 22.

The closure part 42 further comprises a sleeve 62 which, as seen in the direction of the end of the pipe 12, extends beyond the flange 24. The sleeve 62 has two opposite, open-ended notches 64. There is a radially inwardly directed projection 66 next to one side of each notch. In practice, the sleeve 62 defines an internal space in the bayonet closure 40.

The closure part 44 likewise is comprised of two essentially semicircular part elements 68 and 70. Each part element 68 and 70 has two lug-like latching projections 72, which can engage in corresponding latching grooves 74. It is thus also possible to retrofit the closure part 44 on the pipe 14.

The closure part 44 has a continuous axial opening 76, with a diameter that essentially corresponds to the external diameter of the widened section 30 of the pipe 14. The closure part 44 is thus axially movable with respect to the widened section 30 and the flange 36.

The closure part 44 essentially comprises a base body 78, which includes the continuous opening 76. The base body 78 has two opposite, axially running grooves 80, which locally weakens the material of the base body 78 in the region of the continuous opening 76. The circumferential surface 82 of the base body 78 has two axially running slots 84 in the region of the grooves 80, thus producing a flexural bar 86 which is attached at one side. The flexural bar 86 is attached only on that side of the base body 78 which faces away from the flange 36, i.e. on this side it is integrally joined to the base body 78. At its unattached end facing toward the flange 36, the flexural bar 86 has a projection 88 which extends outward.

In the direction of the flange 36, the base body 78 leads into a plug-in section 90, the external diameter of which is greater than the external diameter of the base body 78 and the internal diameter of which is greater than the internal diameter of the continuous opening 76. On its outer circumference, the plug-in section 90 has axially running grooves 92, the base of which coincides with the circumferential surface 82 of the base body 78. The width of the opening of the grooves 92 corresponds to the circumferential length of the projections 66 on the closure part 42. The groove 92 is adjoined by a radially running annular surface 94, via which the plug-in section 90 merges into the base body 78. The annular surface 94 has a first section 96, which runs parallel to the sealing surfaces 22 and 38 and merges into a second section 98 which runs conically or at a slope with respect to the sealing surfaces 22 and 38. Finally, the second section 98 ends at a projection 100 which runs axially, forms a stop and at the same time forms the boundary of the second groove 92.

Overall, the plug-in section 90 has such an axial length that when it is plugged into the sleeve 62 of the closure part 42, its annular surface 94 can engage behind the projections 66. The internal diameter of the plug-in section 90 is greater than an external diameter of the flanges 24 and 36 so that the flanges can be received in the section 90.

Figure 2:
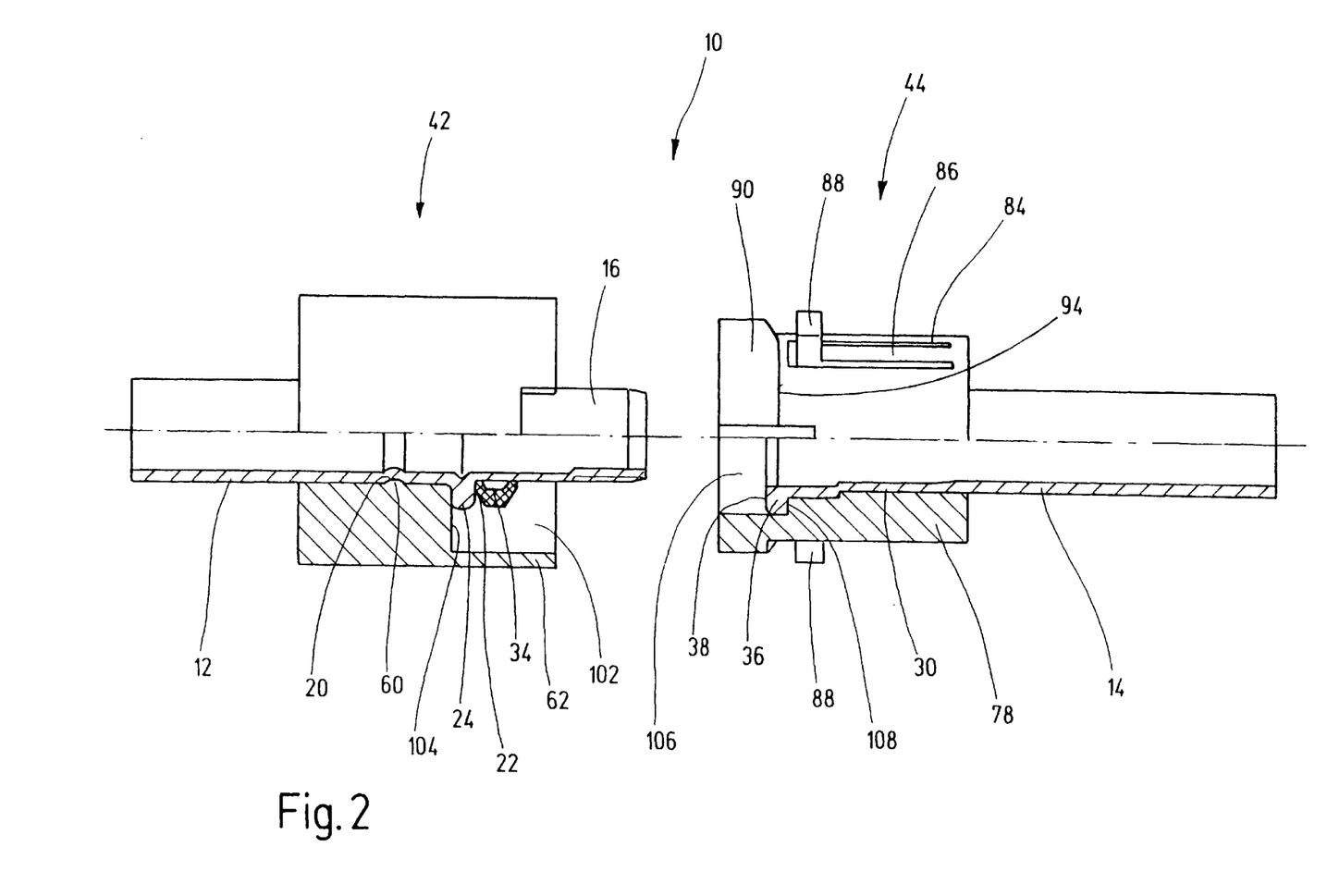
FIG. 2 is a longitudinal sectional view of the arrangement in an unlocked position.
Figure 3:
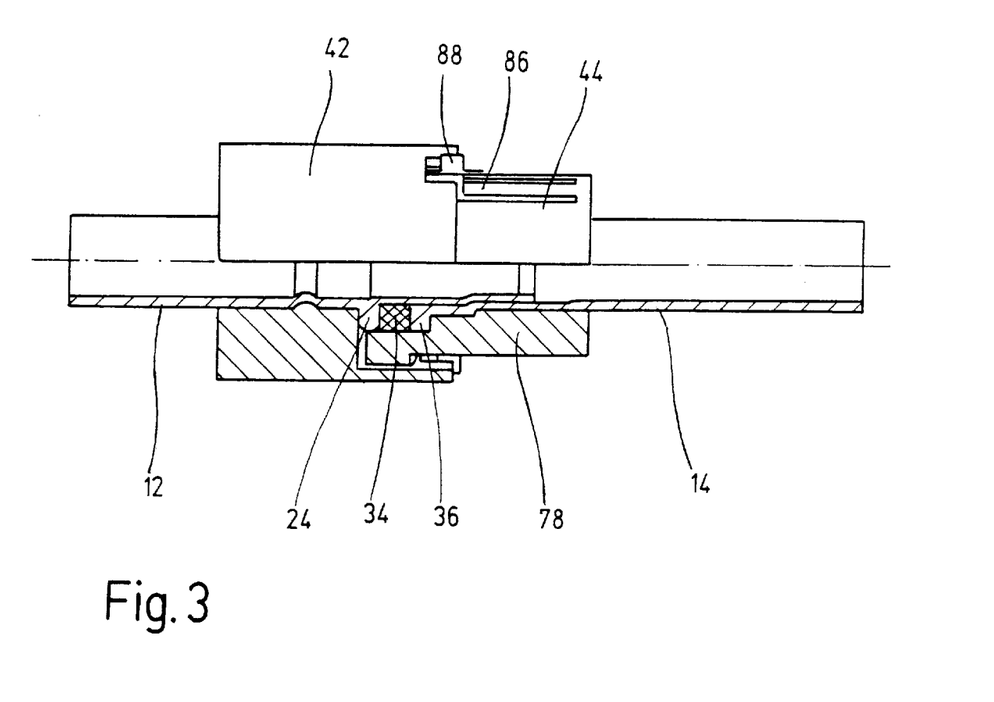
FIG. 3 shows a longitudinal sectional view of the arrangement in a locked position.

FIG. 2 shows a partially sectional view of the arrangement 10 in an unlocked position, while FIG. 3 shows the arrangement 10 in a locked position. Parts which are identical to those in FIG. 1 are provided with the same reference numerals, so that reference can be made to FIG. 1 for a description of these parts.

FIG. 2 shows that the closure part 42 has a defined position on the pipe 12, because the bead 60 engages in the constriction 20. This position is selected so that the sleeve 62 engages around the flange 24 and the sealing device 34 which has been fitted onto the end 16 of the pipe 12, so that these components are arranged in an internal space 102 formed by the sleeve 62. In this case, a radial annular surface 104 of the sleeve 62 bears against that annular surface of the flange 24 which faces away from the sealing surface 22.

The plug-in section 90 of the closure pert 44 engages around the flange 36. The plug-in section 90 thus likewise forms an internal space 106, with the flange 36 inside. A radially running annular surface 108, which is provided between the plug-in section 90 and the base body 78 of the closure part 44, bears against an annular surface of the flange 36, which faces away from the sealing surface 38.

In the locked position shown in FIG. 3, the end region 16 of the pipe 12 engages in the widened section 30 of the pipe 14. The plug-in section 90 of the closure part 44 engages in the sleeve 62 of the closure part 42. Using the steps which are explained with reference to FIGS. 8a to 8e, the closure parts 42 and 44 are rotated with respect to one another on moving from the unlocked position in FIG. 2 to the locked position in FIG. 3. During that process, the closure parts simultaneously move axially closer to one another. The extent to which the closure parts 42 and 44 move axially closer to one another is defined by the contour of the annular surface 94. When the plug-in section 90 is inserted into the sleeve 62, the projections 66 engage in the grooves 92 and pass axially through them, until the inner edge of the projections 66 is in line with the annular surface 94 and can be rotated parallel to the latter.

During the rotation of the closure parts 42 and 44 with respect to one another, the closure parts 42 and 44 do not move axially closer to one another as long as the projections 66 are being guided along the parallel sections 96 of the annular surface 94. Only after the projections 66 reach the sloping or conically running sections 98 of the annular surface 94 during the rotation, then the closure parts 42 and 44 move axially toward one another, corresponding to the incline of the sections 98. The closure parts 42 and 44 are rotated with respect to one another until the projections 66 hit the projections 100, and the locked position is reached.

During relative rotation of the closure parts 42 and 44, the projections 66 pass by the projections 88 on the flexural bars 86. To permit such passage, the flexural bars 86 are pressed into the grooves 80. This can be done manually. Alternatively, the projections 66 have a sloping run-up surface for engaging the projections 88, so that the latter are pressed automatically into the grooves 80 as the rotation progresses. After the projections 66 have passed by the projections 88, the elasticity of the flexural bars 86, cause the projections 88 to snap into the notches 64 in the sleeve 62 which are then adjacent to the projections 66. This blocks the closure parts 42 and 44 with respect to one another, so that it is virtually impossible for them to be unlocked unintentionally. They can be unlocked only if the projections 88, together with their flexural bars 86, are pressed into the grooves 80, as explained further with reference to FIGS. 9a and 9b. Then the closure parts 42 and 44 are rotated in the opposite Direction. The projections 88 simultaneously provide an indication that the arrangement 10 has been locked correctly. In order to emphasize this indication visually, the projections 88 may, for example, be of a different color from the other parts of the bayonet closure 40.

While the closure parts 42 and 44 are moved axially toward one another by relative rotation, a first axial direction force acts on the flange 24 vial the annular surface 104 and a second axial force, which is directed oppositely to the first axial force, acts on the flange 36 via the annular surface 108. The flanges 24 and 36 and hence the pipes 12 and 14 are moved axially toward one another. While the flanges 24 and 36 are moving closer together, the sealing device 34 comes into contact with the sealing surfaces 22 and 38, subjecting the sealing device 34 to axial compression. The extent of the axial compression is determined by the inclination of the section 98 of the annular surface 94. In the locked position of the arrangement 10, the sealing device 34 is compressed sufficiently to ensure a pressure-tight closure of the arrangement 10 without radial compression of the sealing device 34. The sealing action is thus produced exclusively by sealing forces which act axially. In order to achieve this sealing action, the sealing device 34 preferably has a design which is explained with reference to FIGS. 10 and 11.

Figure 4:
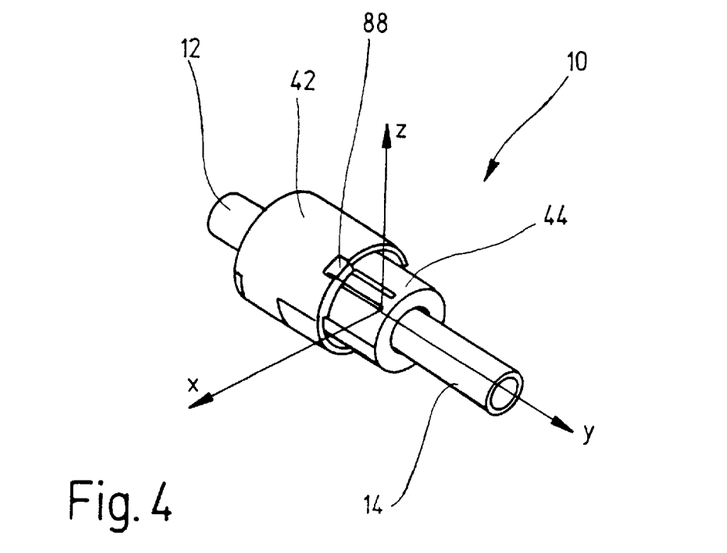
FIG. 4 shows a perspective view of a locked arrangement.

FIG. 4 shows a perspective view of the arrangement 10, again in its locked position. Parts previously described are identified with the same reference numerals.

With reference to the Cartesian coordinate system illustrated, FIG. 4 shows that when the projections 88 have latched in position, the arrangement 10 adopts a defined position in both the X-direction, the Y-direction and in the Z-direction, thus ensuring an optimum sealing action.

Figure 5:
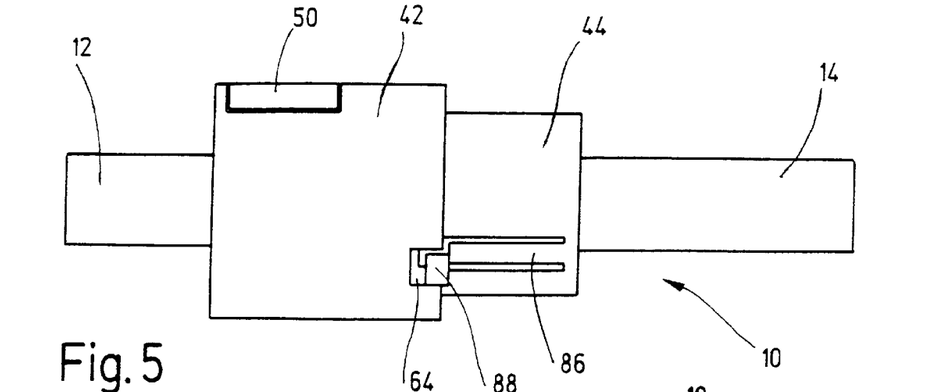
FIGS. 5 and 6 each show a plan view of the locked arrangement.
Figure 6:
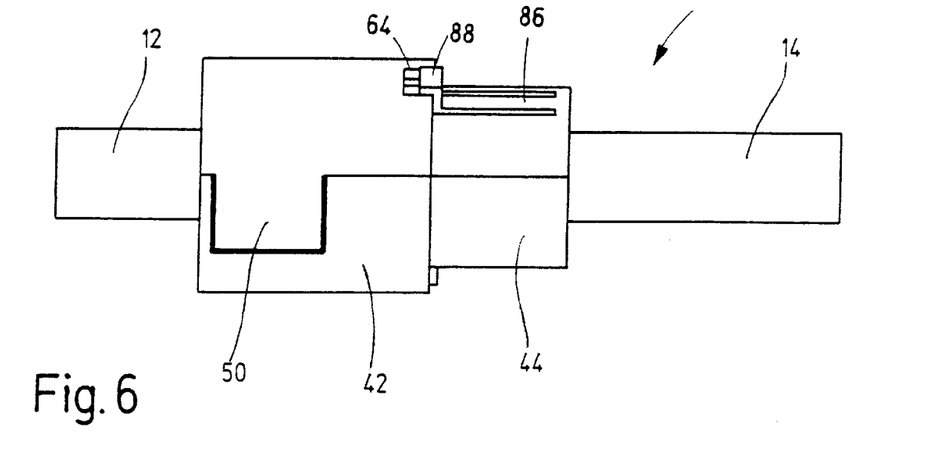

FIGS. 5 and 6 each show a plan view, one rotated through 90° from the other, of the arrangement 10 in its locked position. They show how the closure parts 42 and 44 engage in one another and are blocked by the projections 88 arranged on the flexural bars 86. The projections 88, which have latched in the notches 64, immediately indicate that the arrangement 10 is situated in its locked position.

Figure 7:
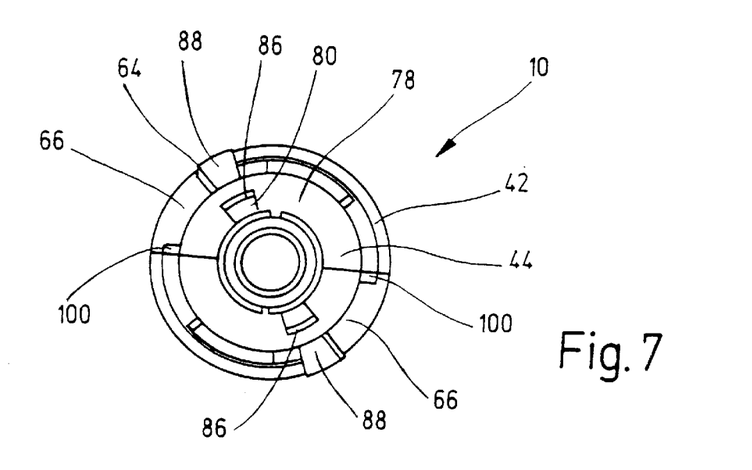
FIG. 7 shows a transverse cross-section through a locked arrangement.

FIG. 7 shows a cross-section of the arrangement 10 in the region of the bayonet closure 40. It shows how the closure parts 42 and 44 are rotated into one another, so that the projections 66 bear against the projections 100 and the projections 88 are latched into the notches 64. The closure parts 42 and 44 are thus locked with respect to one another, securing the arrangement against rotation. It is only possible to unlock the closure parts by pressing the projections 88 inwards, to bend the flexural bars 86, sufficiently far for them to pass beneath the projections 66, while simultaneously rotating the closure parts 42 and 44 with respect to one another.

Figures 8A, 8B, 8C, 8D, 8E:
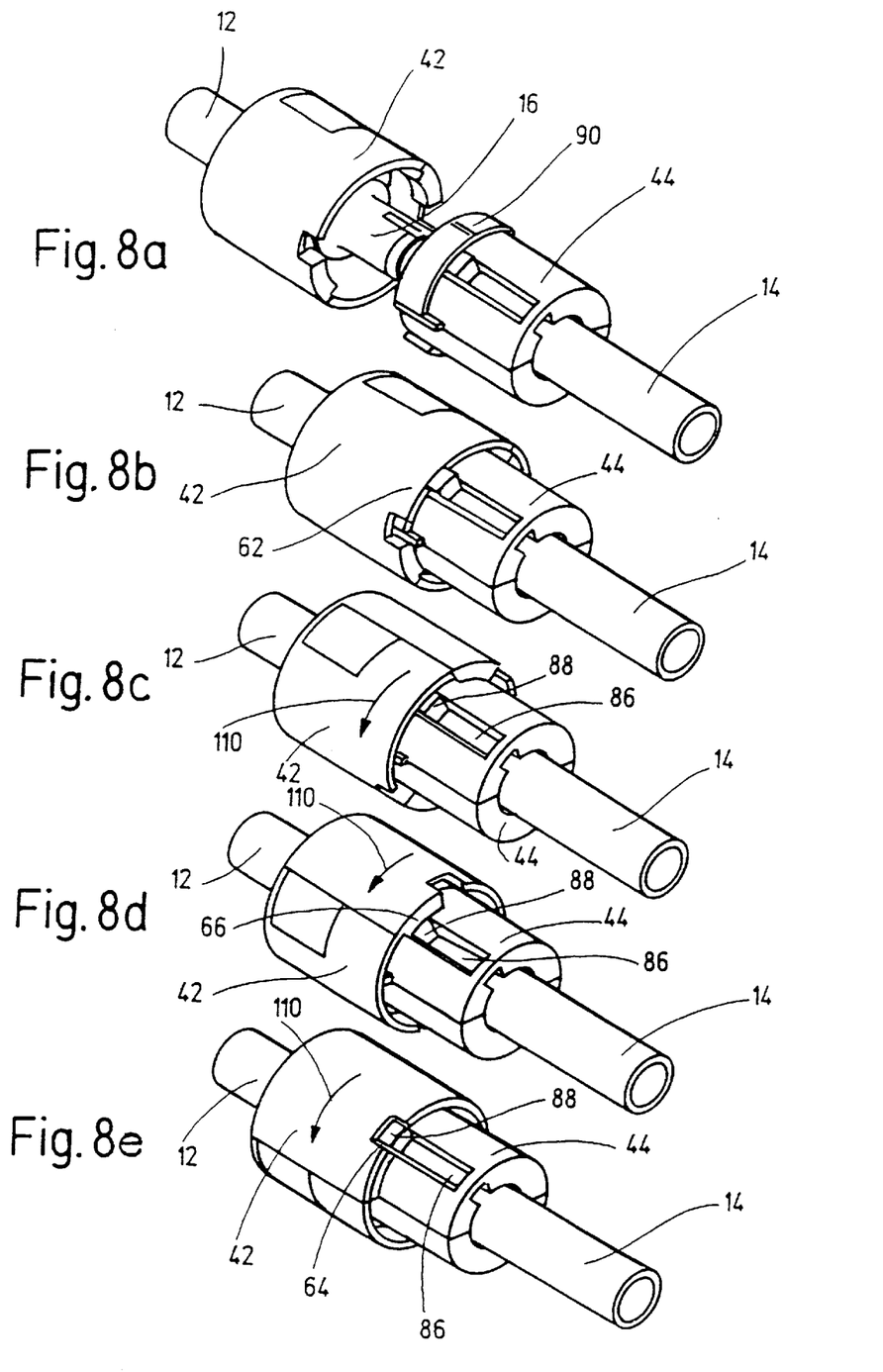
FIGS. 8a to 8e show a sequence of individual steps for reaching the locked position.

FIGS. 8a to 8e show how the arrangement 10 is moved from the unlocked position into the locked position. FIG. 8a shows the unlocked position, with the closure part 42 arranged on the end 16 of the pipe 12 and the closure part 44 arranged on the end 18 of the pipe 14.

In FIG. 8b, the plug-in section 90 of the closure part 44 is introduced into the sleeve 62 of the closure part 42. At the same time, the end 16 of the pipe 12 passes into the widened section 30 (FIG. 1) of the pipe 14. The closure part 44 is pushed into the closure part 42 in a defined position, so that the projections 66 engage in the grooves 92 and are pushed axially through the grooves. After the projections 66 have passed through the grooves 92, the closure parts 42 and 44 are rotated with respect to one another, as shown in FIG. 8c, in the direction indicated by the arrow 110. During this rotation, the projections 66 are guided along the annular surface 94, so that, at the sections 96, the only movement is rotational, while at the sections 98 of the annular surface 94, there is also axial movement. During rotary movement in the direction 110, the projections 88 on the flexural bars 86 are moved in the circumferential direction toward the projections 66. In order to allow the projections 88 to pass by the projections 66, the flexural bars 86 are moved inward, as illustrated in FIG. 8*d*. This inward movement of the flexural bars 86 can be carried out either manually, by applying a radially inwardly acting force to the flexural bars 86, or by a corresponding sloping run-up surface on the projections 66, not illustrated. As the rotary movement in the direction 110 continues, the limit position shown in FIG. 8*e*, i.e. the locked position of the arrangement 10, is reached. The projections 88 have moved past the projection 66 in the circumferential direction and the elasticity of the flexural bars 86 snaps the projections into the notches 64 provided circumferentially next to the projections 66. It is only possible to rotate the closure parts 42 and 44 with respect to one another in the direction counter to the arrow 110, for unlocking the arrangement 10, if the projections 88 are pressed radially inward and are pushed under the projections 66.

Figure 9A:
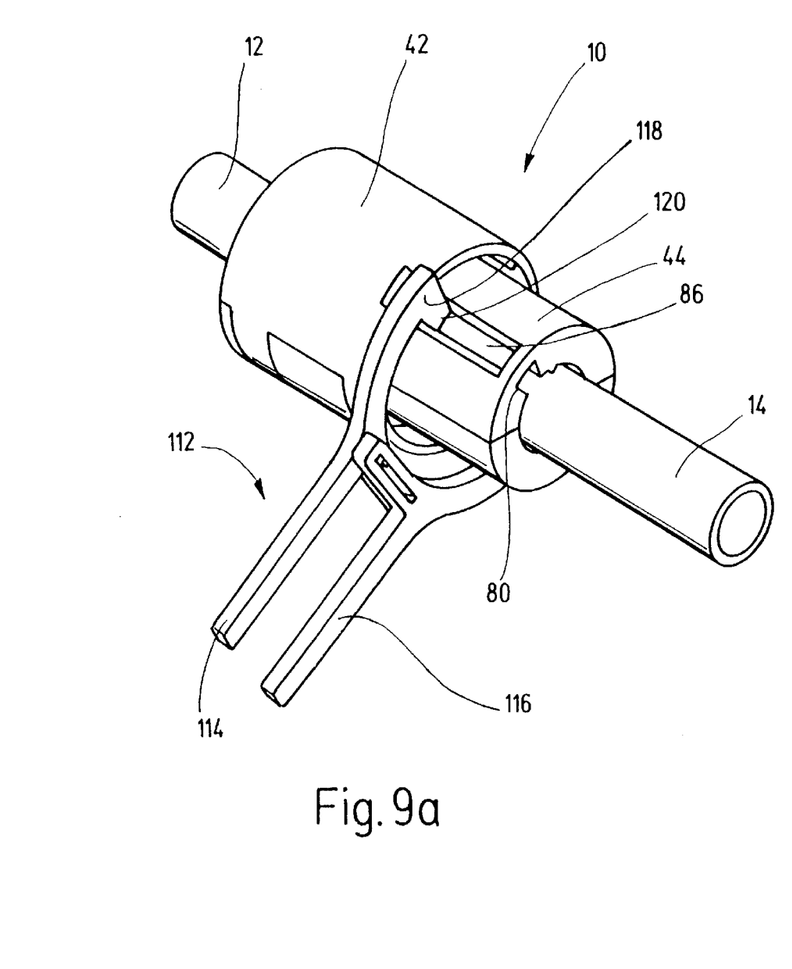
FIGS. 9a and 9b show a series individual steps for unlocking the arrangement.
Figure 9B:
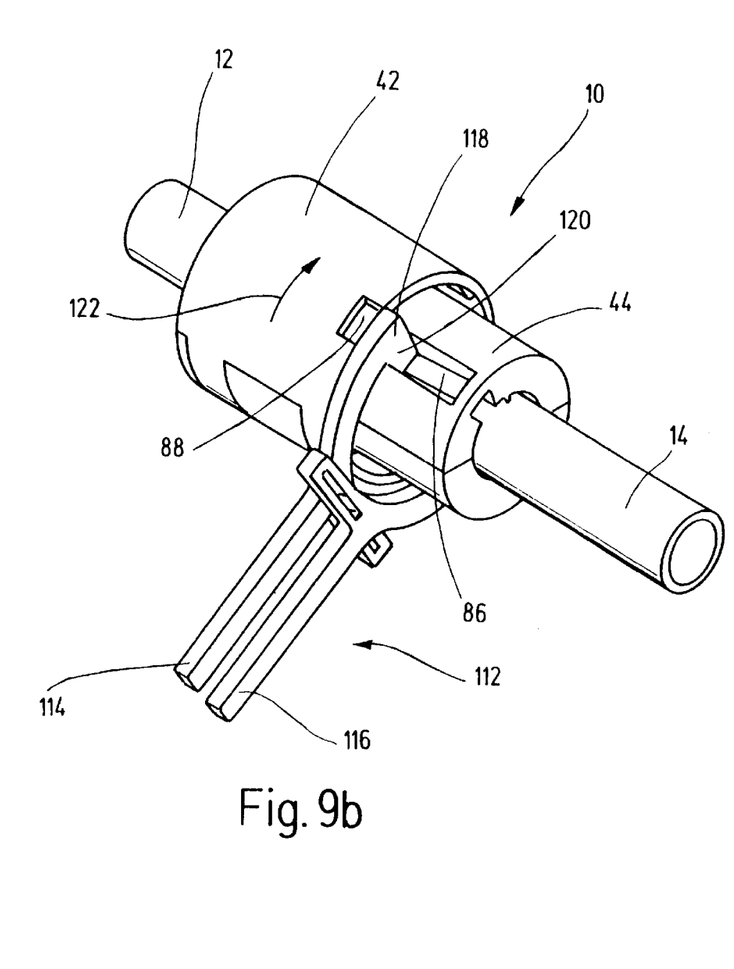

FIGS. 9*a* and 9*b* show an example of how the arrangement 10 can be unlocked. A tool 112, which is similar to a pair of pliers, has two parts 114 and 116 which can move with respect to one another. Each part 114 and 116 forms a head 118 which ends in a hook-like inward projection 120. The projections 120 are formed to engage in the grooves 80 where they can press the flexural bars 86 radially inward, together with the projections 88 attached or provided thereon. In FIG. 9*b*, the projections 88 are pressed sufficiently far inward radially for them to reach an imaginary circumferential line which lies beneath the projections 66. If the closure part 42 is simultaneously rotated, the arrangement 10 is unlocked by relative rotation of the part 42 in the direction of arrow 122.

While the arrangement 10 is being unlocked, the closure parts 42 and 44 are both rotated with respect to one another and move axially apart. This relieves the load on the sealing device 34. Since the sealing device 34 has been axially preloaded by the flanges 24 and 36, relieving the load on the sealing device 34 assists with unlocking the arrangement 10, so that this can be accomplished without applying great external forces.

In particular, the load on the sealing device 34 is to be axially relieved while the projections 66 are still being moved along the sloping or conically running section 98 of the annular surface 94 toward the parallel section 96. This ensures that the sealing action is eliminated before the arrangement 10 is completely unlocked. It is thus possible for a pressurized medium in the pipes 12 and 14 to escape between the flanges 24 and 36, since the sealing action of the sealing device 34 has already been eliminated while the closure parts 42 and 44 are still in engagement with one another. This prevents the bayonet closure 40 from suddenly springing open due to excess pressure prevailing in the pipes 12 and 14. Furthermore, the medium is unable to escape suddenly in an uncontrolled manner, which could be hazardous to people or equipment.

An important feature of the arrangement 10 is that a sealing device 34 which acts only axially is provided and that axial travel of the closure parts 42 and 44 to reach their unlocked position is greater than that axial travel of the sealing surfaces 22 and 38 which is necessary to relieve the load on the sealing device 34.

Figure 10:
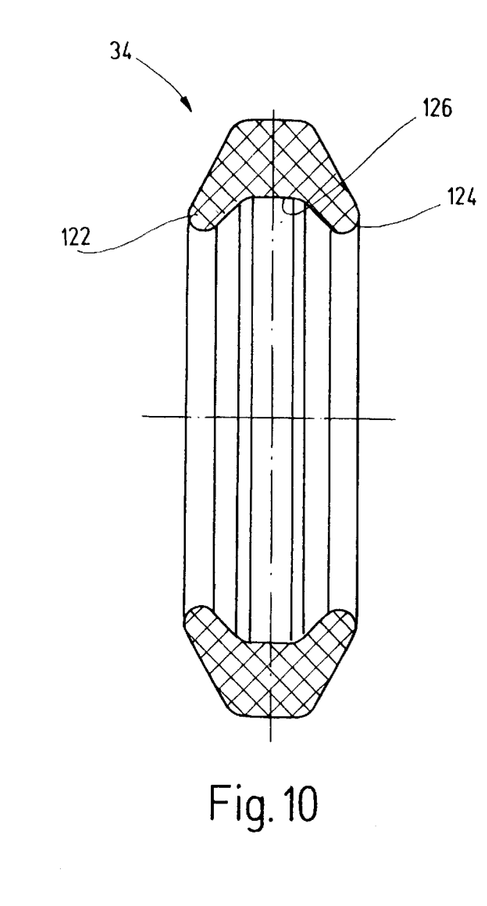
FIG. 10 shows a sectional view through a sealing device in accordance with a first variant.
Figure 11:
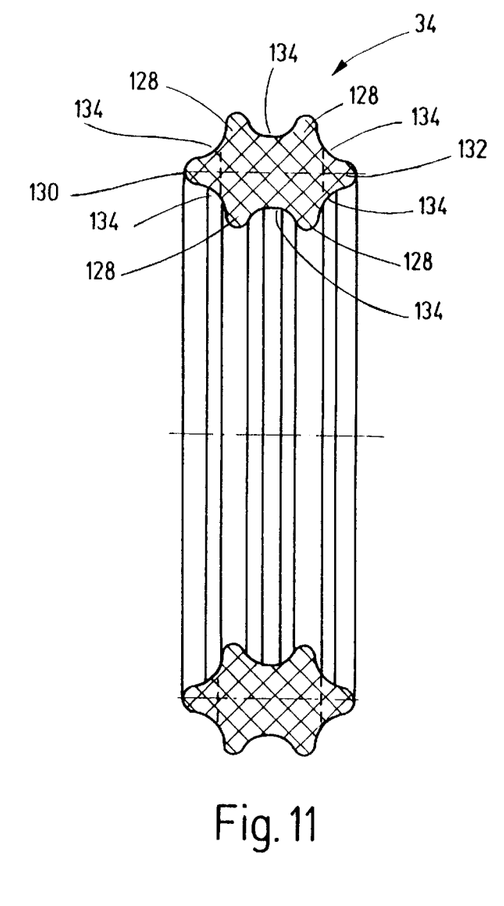
FIG. 11 shows a sectional view through a sealing device in accordance with a second variant.

FIGS. 10 and 11 illustrate two exemplary embodiments of the sealing device 34 which ensure that the sealing device 34 has an essentially axial sealing action.

The sectional illustration of FIG. 10 shows a sealing device 34 having an approximately trapezoidal cross-section, which leads into sealing beads 122 and 124 which are directed radially inward at an angle inclined axially outward to form a free space 126 between them. In this case, the sealing bead 122 is assigned to the sealing surface 22 while the sealing bead 124 is assigned to the sealing surface 38. This special shaping of the sealing device 34 means that when a sealing force is applied to the sealing beads 122 and 124 of the sealing surfaces 22 and 38, these sealing beads are pressed into the free space 126. The elasticity of the material of the sealing device 34 results in an opposing force being built up in the sealing beads 122 and 124. This force ensures that the sealing device bears tightly and firmly against the sealing surfaces 22 and 38. It is virtually impossible for the sealing device 34 to be deformed or stretched radially during its axial compression, since the free space 126 accommodates material displaced by the axial compression.

When the arrangement 10 is unlocked, the elasticity of the sealing beads 122 and 124 exerts pressure on the sealing surfaces 22 and 38, so that the sealing device 34 itself helps the surfaces to move axially apart.

In the embodiment shown in FIG. 11, the sealing device 34 has beads 128 which are arranged symmetrically over its circumference and run in the circumferential direction, and also has sealing beads 130 and 132 which also run in the circumferential direction. The beads 128 provided on the inner circumference and on the outer circumference serve only to support the sealing device 34 on the end 16 of the pipe 12 or on the inner circumference of the plug-in section 90. The sealing action is performed by the sealing beads 130 and 132, which contact in the axial direction on the one hand with the sealing surface 22 and on the other hand with the sealing surface 38. By moving the sealing surfaces 22 and 38 axially toward one another, the sealing beads 130 and 132 are deformed elastically, producing the sealing action. This elastic deformation of the sealing beads 130 and 132 does not lead to radial deformation of the sealing device 34, since the free spaces 134, which are formed between the beads 128 and the sealing beads 130 and 132, accommodate the displaced material.

The closure parts 42, 44 can be produced as plastic injection molded parts in a manner which is suitable for mass production.

According to a further variant, the closure parts 42, 44 may be produced as castings, in particular aluminum die castings. In this case, it is possible to dispense with the formation of the flexural bars 86, so that locking is effected exclusively by the projections 66 and the plug-in section 90.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An arrangement for connecting first and second pipe ends of a first and second pipe, respectively, the arrangement comprising:

a first pipe having a first end and having a first sealing surface on the first pipe; a second pipe having a second end and having a second sealing surface on the second pipe wherein the pipe ends are movable toward each other in an axial direction to move the sealing surfaces toward each other;

a first and a second closure part respectively at the first and the second pipe ends, the first and second closure parts being adapted to engage one another, and once engaged, the first and second closure parts have a first relative axial position; the closure parts being so shaped, where they engage one another that when they are rotated in one direction, they are moved from the first axial position with respect to each other to reach a second locked position at a second relative axial position closer to each other, the first and second closure parts also defining between them a bayonet-type closure;

an annular sealing device disposed between the first and second sealing surfaces, the sealing device being shaped so that when the sealing device is positioned between the first and second sealing surfaces while the first and second closure parts are in the second locked position, the sealing device is clamped between the first and second sealing surfaces for providing a sealed closure of the pipe ends at the sealing surfaces, the bayonet connection of the closure parts being adapted to enable the sealing surfaces to be moved in the axial direction with respect to one another until the closure parts are moved into the second locked position, and the closure parts further enabling the sealing surfaces to be spaced apart sufficiently so as not to be sealed tightly against the sealing device when the closure parts are in the first position, and the closure parts being thereafter further movable with respect to one another by relative rotation thereof for moving the sealing surfaces into sealing engagement with the sealing device and for clamping the sealing device only in the axial direction.

2. The arrangement of claim 1, wherein the closure parts are so sized and shaped that a movement in the axial direction of the closure parts from the locked to an unlocked position is greater than a movement in the axial direction for relieving loading on the sealing device upon moving the pipe ends apart.

3. The arrangement of claim 2, wherein the closure parts together define an internal space and the sealing device is arranged to be within the internal space.

4. The arrangement of claim 2, wherein each of the first and second closure parts is arranged rotatably on a respective one of the first and second pipe ends.

5. The arrangement of claim 4, wherein each of the first and second closure parts comprises a plurality of partial elements which are joined together to define the respective one of the first and second closure parts around the respective one of the first and second pipe ends.

6. The arrangement of claim 5, wherein the partial elements of each one of the first and second closure parts include latching elements for latching the partial elements of each of the first and second closure parts together to define respective first and second closure parts.

7. The arrangement of claim 4, wherein the first closure part comprises a sleeve and the second closure part has a plug-in section extending toward the first closure part, the plug-in section being insertable into the sleeve of the first closure part when the closure parts are brought together to the locked position.

8. The arrangement of claim 1, further comprising the first pipe having a first pipe end region at the first end with the first sealing surface thereon and the second pipe having a second pipe end region at the second end with the second sealing surface thereon, wherein the first and second sealing surfaces are defined on and are part of a respective one of the first and second pipe end regions.

9. The arrangement of claim 8, wherein each of the first and second pipe end regions has an end facing an end of the first and second pipe end regions, one of the first and second pipe end regions including a widened section and the other of the first and second pipe end regions being shaped for fitting into the widened section when the pipe end sections are brought together, the sealing surfaces being so placed as to not interfere with fitting of the other of the first and second pipe end into the widened section of the one of the first second pipe end.

10. The arrangement of claim 8, wherein each of the first and second pipe end regions has an end facing an end of the first and second pipe end regions, one of the first and second pipe end regions including a widened section and the other of the first and second pipe end regions being shaped for fitting into the widened section when the pipe end regions are brought together, the sealing surfaces being so placed as to not interfere with fitting of the other of the first and second pipe end into the widened section of the one of the first and second pipe end.

11. The arrangement of claim 10, wherein the first pipe end region has a first flange, the second pipe end region has a second flange and the first and second flanges respectively have the the first and second sealing surfaces thereon.

12. The arrangement of claim 4, wherein the first pipe end has a first flange, the second pipe end has a second flange and the first and second flanges respectively have the first and second sealing surfaces thereon;

the first closure part being shaped to receive the second flange and the second closure part being shaped to receive the first flange, each of the first and second flanges has a respective annular surface which faces away from the sealing surface of the other of the first and second flanges and which bears against the respective closure part of the other of the first and second pipe ends, when the closure parts are brought together to the locked position such that the closure parts urge the flanges toward each other.

13. The arrangement of claim 10, wherein one of the first and second closure parts includes a circumferential surface and has an annular surface along the circumferential surface by which the other of the first and second closure parts may be engaged, the annular surface being shaped for controlling an axial movement of the closure parts relative to each other when the closure parts are engaged, a first annular surface section along a lengthwise direction of the annular surface extending generally parallel to the sealing surfaces around the one of the first and second closure parts and a second annular surface section along the lengthwise direction of the annular surface extending along the circumferential surface of the one of the first and second closure parts in a manner which is sloped in the axial direction with respect to the first annular surface section;

the other of the first and second closure parts engages the annular surface; and a rotated position of the closure parts relative to one another and engagement between the closure parts determines an axial position of the closure parts with respect to each other in attaining the locked position and to attain an unlocked position thereof.

14. The arrangement of claim 1, wherein the sealing device is an annular element having a profile such that the annular element is axially compressible between the sealing surfaces without significant radial stretching thereof.

15. The arrangement of claim 14, wherein the sealing device has a profile including sealing beads which extend radially inwardly and are inclined outwardly, the beads being shaped and of such length as to define a free space between the beads and the beads are deflectable into the free space upon contact with the sealing surfaces.

16. The arrangement of claim 14, wherein the sealing device has a profile including beads thereon, first beads extend radially for supporting the sealing device and second sealing beads extend axially, the first and second beads projecting so as to define free spaces between neighboring beads including free spaces between one of the second beads and the adjacent first bead into which the first and second beads are deflectable upon the second beads contacting the sealing surfaces.

17. The arrangement of claim 1, wherein the closure parts are plastic material parts.

18. The arrangement of claim 1, wherein the closure parts are aluminum die castings.

19. The arrangement of claim 2, wherein one of the first and second closure parts includes a circumferential surface and has an annular surface along the circumferential surface by which the other of the first and second closure parts may be engaged, the annular surface being shaped for controlling an axial movement of the closure parts relative to each other when the closure parts are engaged, a first section along a lengthwise direction of the annular surface extending generally parallel to the sealing surfaces and around the one of the first and second closure parts and a second section of the annular surface extending along the circumferential surface of the one of the first and second closure parts in a manner which is sloped in the axial direction with respect to the first section;

the other of the first and second closure parts engages the annular surface; and a rotated position of the closure parts relative to one another and engagement between the closure parts determines an axial position of the closure parts with respect to each other in attaining the locked position and to attain an unlocked position thereof.

* * * * *